Sept. 12, 1967   R. F. LECHNER   3,340,840
METHOD OF PRODUCING SEAMLESS METAL BOTTLES AND AN APPARATUS
FOR CARRYING OUT THE METHOD
Filed July 20, 1965

RUDOLF F. LECHNER
INVENTOR.

BY Edwin Levisohn
and Henry R. Lerner
ATTORNEYS

United States Patent Office 3,340,840
Patented Sept. 12, 1967

3,340,840
METHOD OF PRODUCING SEAMLESS METAL BOTTLES AND AN APPARATUS FOR CARRYING OUT THE METHOD
Rudolf F. Lechner, Singen, Hohentwiel, Germany, assignor to Ladoco Aktiengesellschaft, Zug, Switzerland, a corporation of Switzerland
Filed July 20, 1965, Ser. No. 473,335
2 Claims. (Cl. 113—120)

ABSTRACT OF THE DISCLOSURE

The present invention is for a method of shaping and finishing seamless metal bottles of the aerosol type by first forming a cup-shaped hollow body into bottle shape having a main body portion and a neck portion and by subsequently simultaneously moving a pair of milling cutter blades disposed at right angles to each other in a rectilinear direction for cutting the bottle neck portion length to a predetermined size with one of said blades and for simultaneously reducing the wall thickness of the neck portion with the other of said blades. The apparatus used comprises a milling cutter which carries a rotary guide adapted to be introduced into the neck portion of the bottle. The milling cutter also carries a pair of cutting blades disposed at right angles to each other so that rectilinear movement of the cutter is operative to cut the bottle neck portion length to said predetermined size with one of the blades and to simultaneously reduce the wall thickness of the neck portion with the other of said blades.

---

Seamless metal bottles, for example aerosol bottles, can be manufactured by first producing by impact extrusion a cup-shaped hollow body in which that end which provides the bottle opening is brought into the form of a bottle neck by drawing it in or reducing it by means of rectilinearly moved shaping elements, the neck being beaded also by means of rectilinearly moved shaping elements.

The object of the invention is to provide a method of producing seamless metal bottles, more particularly aerosol bottles which makes possible the production of seamless metal bottles with large external diameter. The shaping of the cup-shaped hollow body by means of rectilinearly moved shaping elements makes it possible to lacquer and/or to print the said hollow body first and then shaping it in the above mentioned manner. But in the production of bottles with large external diameter there arise difficulties because the wall of the bottle neck, which must have a predetermined diameter in order to accommodate the valve, becomes very thick owing to the considerable amount of upsetting which occurs in the case of large bottle diameters, so that it may not be possible, under certain circumstances, to effect the beading with the aid of rectilinearly moved tools. Therefore generally the beading is carried out by rolling tools.

According to one feature of the invention, the bottle neck is brought to a predetermined wall thickness by machining on the outer side before it is beaded. In this manner it is possible to machine bottles with large diameter by means of rectilinearly moved shaping elements.

The invention relates further to an apparatus for carrying the method of the invention into effect having two horizontally disposed carrying plates which are arranged coaxially in a relatively rotatable manner and are also adapted to be moved rectilinearly one towards the other, the lower one of said carrying plates serving to accommodate workpiece holders receiving the workpiece, the upper one to accommodate the tools, a milling cutter being provided as the tool for cutting the bottle neck, said milling cutter carrying a rotary guide for engagement in the bottle neck.

In this apparatus cup-shaped hollow bodies preferably produced by impact extrusion are inserted. Then the end which provides the opening of the hollow body is shaped by the said rectilinearly moved shaping elements arranged at the upper carrying plate.

According to a feature of the invention the milling device has blades in two planes at right angles to each other, one of which blades works the end edge and the other the outer wall surface of the bottle neck.

Figure 1:
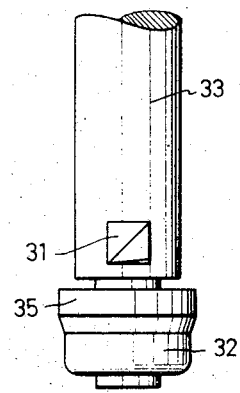
Figure 2:
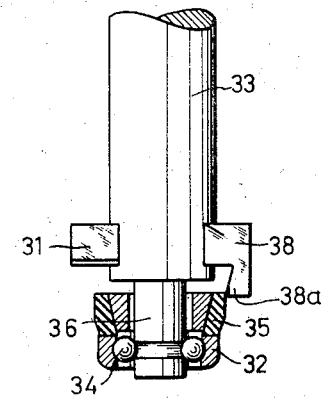
Figure 3:
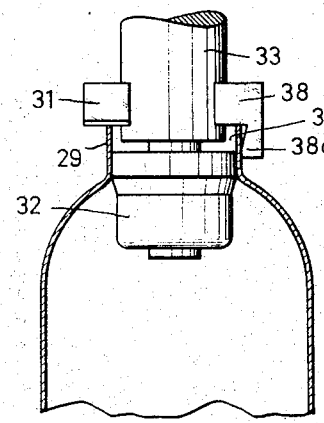

An example of embodiment of the invention is described in detail hereinafter, by way of example, with reference to the accompanying drawings, in which:

FIGURES 1 and 2 show a form of construction of the device according to the invention in side view and in longitudinal section, and FIGURE 3 shows the device according to FIGURES 1 and 2 in working position.

After the bottle neck 29 has been drawn in, it is cut to a predetermined length by means of a cutting tool driven by a motor (not shown). The cutting tool comprises milling cutters 31, 38 and a rotary guide 32 which is moved only rectilinearly with respect to the bottle neck 29 after it has been introduced, so that relatively slight friction occurs at the bottle neck 29 and the protective internal lacquer adhering to the neck is not damaged. The spindle 33 carrying the milling cutters 31 and 38 has a reduced diameter part 36 at its lower end and carries the cylindrical guide 32 which is easily rotatable on a ball bearing 34.

A packing 35 provided on the guide 32 prevents cuttings reaching the inside of the bottle, which cuttings, if the bottle is to be used as an aerosol bottle, could later block the valve and make the bottle unusable. The milling cutter 31 operates on the bottle neck 29 at its upper edge, whereas the milling cutter 38 operates on the wall of the bottle neck 29 with its blade 38a, bringing the bottle neck to a certain thickness which enables the bottle neck to be beaded by means of rectilinearly moved tools.

On the upward movement of the spindle 33 after the cutting operation, the cuttings contained in the space 37 are brought out of the bottle neck by the packing 35. After the packing 35 has left the bottle neck, it gradually assumes the speed of the spindle 33, whereby the cuttings are thrown outwardly by centrifugal force. Preferably, a suction device (not shown) is provided which carries the cuttings away.

By this device it is possible to work the bottle neck to the desired length and on the outer side in a single operation. As a result seamless metal bottles with large external diameter can be produced in a simple manner.

What is claimed is:

1. A method of shaping and finishing seamless metal bottles comprising the steps of:
   (a) forming a cup-shaped hollow body into bottle shape having a main body portion and a neck portion; and
   (b) simultaneously moving a pair of milling cutter blades disposed at right angles to each other in a rectilinear direction for cutting the bottle neck portion length to a predetermined size with one of said blades and for simultaneously reducing the wall thickness of the neck portion with the other of said blades.

2. Apparatus for shaping and finishing seamless metal bottles having a body portion and a neck portion comprising:

(a) a milling cutter;
(b) a rotary guide carried by said milling cutter and adapted to be introduced into said bottle through the neck portion thereof; and
(c) a pair of cutting blades carried by said cutter for movement in unison therewith;
(d) said blades being in planes at right angles to each other whereby rectilinear movement of said cutter is operative to cut the bottle neck portion length to a predetermined size with one of said blades and to simultaneously reduce the wall thickness of said neck portion with the other of said blades.

References Cited

UNITED STATES PATENTS

| | | | |
|---|---|---|---|
| 870,734 | 11/1907 | Meyers et al | 29—105 |
| 1,800,526 | 4/1931 | Higgins et al. | 113—120 |
| 2,337,182 | 12/1943 | Calleson et al. | 113—120 |
| 2,409,776 | 10/1946 | Maples | 29—105.1 |
| 2,865,237 | 12/1958 | Degen Hart | 20—105.1 |
| 3,232,260 | 2/1966 | Siemonsen | 113—7 |
| 3,266,451 | 8/1966 | Kraus | 113—120 |

RICHARD J. HERBST, *Primary Examiner.*